(12) United States Patent
Gavriliu et al.

(10) Patent No.: US 7,076,516 B2
(45) Date of Patent: Jul. 11, 2006

(54) EFFICIENT METHOD OF IDENTIFYING NON-SOLUTION OR NON-OPTIMAL REGIONS OF THE DOMAIN OF A FUNCTION

(75) Inventors: Marcel Gavriliu, Pasadena, CA (US); Alan H. Barr, Pasadena, CA (US)

(73) Assignee: California Institute of Technology, Pasedena, CA (US)

( * ) Notice: Subject to any disclaimer, the term of this patent is extended or adjusted under 35 U.S.C. 154(b) by 468 days.

(21) Appl. No.: 09/956,590

(22) Filed: Sep. 18, 2001

(65) Prior Publication Data

US 2002/0133475 A1 Sep. 19, 2002

Related U.S. Application Data

(60) Provisional application No. 60/234,829, filed on Sep. 22, 2000, provisional application No. 60/233,545, filed on Sep. 19, 2000.

(51) Int. Cl.
*G06F 7/38* (2006.01)
(52) U.S. Cl. ..................................................... 708/446
(58) Field of Classification Search ................ 708/446, 708/200, 207, 800, 300
See application file for complete search history.

(56) References Cited

U.S. PATENT DOCUMENTS

| 3,789,203 | A | * | 1/1974 | Catherall et al. | ........... 708/290 |
| 5,381,361 | A | * | 1/1995 | Kirk et al. | .................. 708/801 |
| 5,631,858 | A | * | 5/1997 | Narita et al. | ................. 708/443 |
| 5,717,621 | A | * | 2/1998 | Gupta et al. | ................. 708/446 |
| 5,884,245 | A | * | 3/1999 | Chandler | ..................... 708/446 |
| 6,078,938 | A | * | 6/2000 | Pan et al. | .................... 708/500 |
| 6,115,726 | A | * | 9/2000 | Ignjatovic | .................... 708/300 |
| 6,510,354 | B1 | * | 1/2003 | Lin | ........................... 708/300 |
| 6,757,569 | B1 | * | 6/2004 | Lin | ........................... 708/300 |
| 2004/0158592 | A1 | * | 8/2004 | Nikitin et al. | |

FOREIGN PATENT DOCUMENTS

GB 1362910 8/1974

OTHER PUBLICATIONS

Taylor et al., Convergence analysis and optimisation of an iterative technique for polynomial factorisation, Sep. 1989, IEEE, p. 507-511.*
Stuart, LP-Form inclusion functions for global optimisation, 1991, IEEE, pp. 51-65.*

(Continued)

*Primary Examiner*—Kakali Chaki
*Assistant Examiner*—Chat C. Do
(74) *Attorney, Agent, or Firm*—Howrey LLP

(57) ABSTRACT

A method of identifying one or more regions of the domain of a function that do not contain solutions is described along with a related subdivision method. These methods may be employed in the context of branch and bound methods that use interval analysis to search for solutions of functions. The one or more regions of the function domain that do not contain solutions are identified using a cropping formula derived from one or more components (low order and high order) of a Taylor Form inclusion function. A Corner Taylor Form inclusion function is also described which might be used to identify the output range of a function.

9 Claims, 12 Drawing Sheets

OTHER PUBLICATIONS

Hanson, P. et al., *Decomposition and Interval Arithmetic Applied to Global Minimization of Polynomial and Rational Functions*, Journal of Global Optimization, vol. 3, 1993, pp. 421-437.

Lagouanelle, J-L, and Messine, F., *Algorithme d'encadrement de l'optimum global d'une fonction différentiable*, C.R. Acad. Sci. Paris—Analyse Numérique, vol. 326, 1998, pp. 629-632.

Messine, F. and Lagouanelle, J-L, *Enclosure Methods for Multivariate Differentiable Functions and Application to Global Optimization*, Journal of Universal Computer Science, vol. 4, No. 6, 1998, pp. 589-603.

Snyder, John M., *Interval Analysis For Computer Graphics*; in Proceedings of SIGGRAPH 1992, ACM SIGGRAPH, pp. 121-130, 1992.

Moore, Ramon E., *Interval Analysis*; Prentice Hall, Inc., pp. 1-145, 1966.

Ratchek, H. and Rokne, J., *New Computer Methods for Global Optimization*, Ellis Horwood Ltd. 1988, pp. 7-71.

Snyder, J., *Generative Modeling for Computer Graphics and CAD: Symbolic Shape Design Using Interval Analysis*, Academic Press, Inc. 1992, pp. 1-2; 121-217.

* cited by examiner

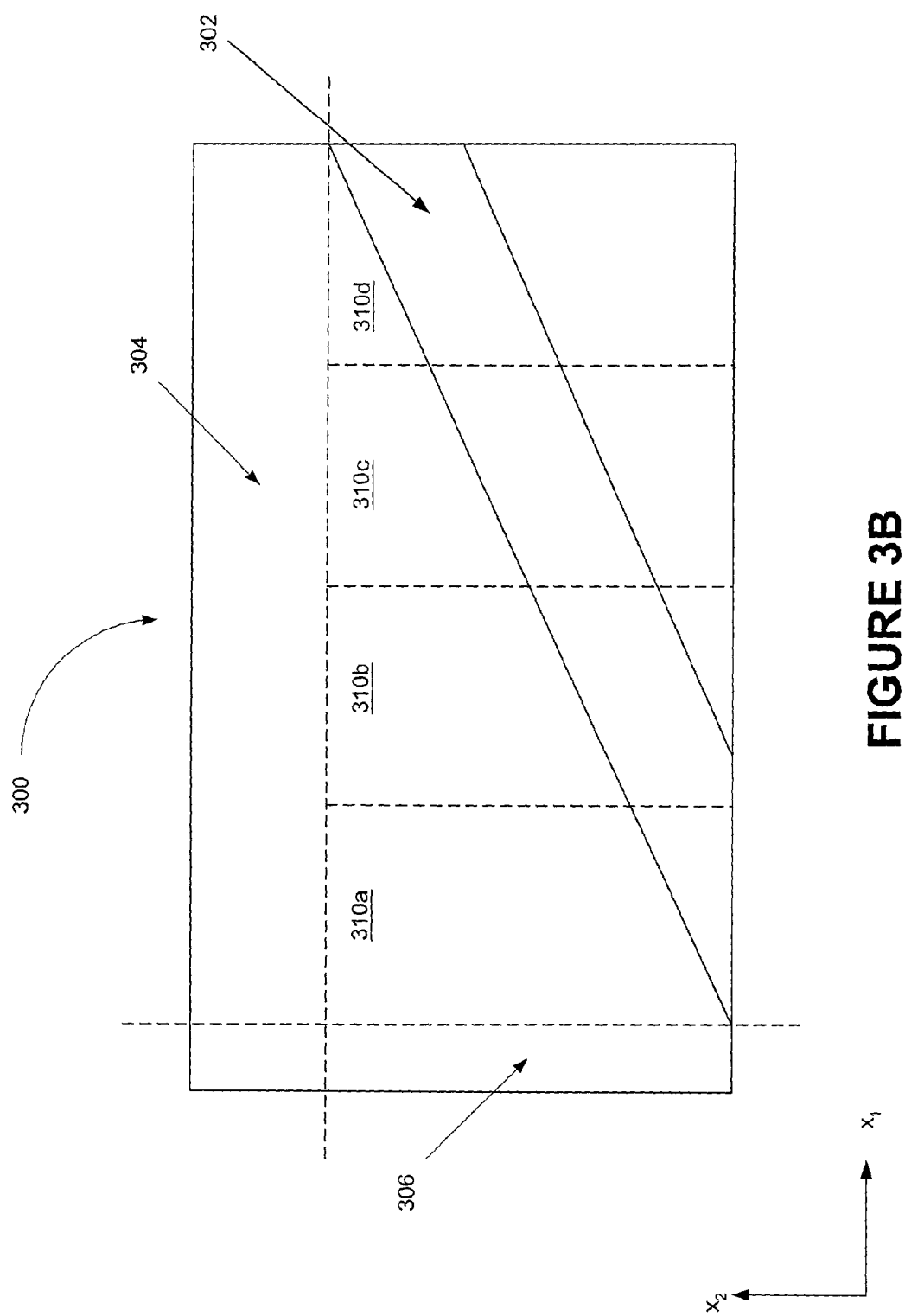

Proof that the order in which each dimension of a possible solution region is cropped does not affect the output result:

$\bar{x} \in \bar{X} \subset R^n$ $p(\bar{x}) = \sum_{i \in I \subset N^n} a_i \{\bar{x}^i\}* = a_0 + \sum_{1 \leq j \leq n} a_j x_j + NL(\bar{x})$ If $p(\bar{x}) = 0$ then, $a_0 + \sum_{1 \leq j \leq n} a_j x_j + NL(\bar{x}) = 0$ Let, $X_k^* = X_k \cap \dfrac{-a_0 - \sum_{\substack{1 \leq j \leq n \\ j \neq k}} a_j X_j - NL(\bar{X})}{a_k}$ $X_l^* = X_l \cap \dfrac{-a_0 - \sum_{\substack{1 \leq j \leq n \\ j \neq l}} a_j X_j - NL(\bar{X})}{a_l}$ $X_k^{**} = X_k \cap \dfrac{-a_0 - \sum_{\substack{1 \leq j \leq n \\ j \neq k, l}} a_j X_j - a_l X_l^* - NL(\bar{X})}{a_k}$ then, $X_k^{**} = X_k \cap \dfrac{-a_0 - \sum_{\substack{1 \leq j \leq n \\ j \neq k, l}} a_j X_j - a_l \left( X_l \cap \dfrac{-a_0 - \sum_{\substack{1 \leq j \leq n \\ j \neq l}} a_j X_j - NL(\bar{X})}{a_l} \right) - NL(\bar{X})}{a_k} =$ $= X_k \cap \dfrac{-a_0 - \sum_{\substack{1 \leq j \leq n \\ j \neq k}} a_j X_j - NL(\bar{X})}{a_k} \cap \dfrac{-a_0 - \sum_{\substack{1 \leq j \leq n \\ j \neq k, l}} a_j X_j - a_l \left( \dfrac{-a_0 - \sum_{\substack{1 \leq j \leq n \\ j \neq l}} a_j X_j - NL(\bar{X})}{a_l} \right) - NL(\bar{X})}{a_k} =$ $= X_k \cap \dfrac{-a_0 - \sum_{\substack{1 \leq j \leq n \\ j \neq k}} a_j X_j - NL(\bar{X})}{a_k} \cap \dfrac{-a_0 - \sum_{\substack{1 \leq j \leq n \\ j \neq k, l}} a_j X_j + a_0 + \sum_{\substack{1 \leq j \leq n \\ j \neq l}} a_j X_j + NL(\bar{X}) - NL(\bar{X})}{a_k} =$ $= X_k \cap \dfrac{-a_0 - \sum_{\substack{1 \leq j \leq n \\ j \neq k}} a_j X_j - NL(\bar{X})}{a_k} \cap \dfrac{a_k X_k}{a_k} =$ $= X_k \cap \dfrac{-a_0 - \sum_{\substack{1 \leq j \leq n \\ j \neq k}} a_j X_j - NL(\bar{X})}{a_k} \cap X_k =$ $= X_k^*$ Therefore $X_k^* = X_k^{**}$

FIGURE 6

Proof that the width of the intervals generated using the corner form inclusion function is smaller than those of the corresponding intervals generated using the natural extension:

$\bar{x} \in R_+^n, \bar{x}_0 \in R_+^n, and \|\bar{x}_0\| \leq \|\bar{x}\|$ $$p(\bar{x}) = \sum_{i \in I \subset N^n} a_i \{\bar{x}^i\}^* = \sum_{\substack{i \in I \subset N^n \\ a_i > 0}} a_i \{\bar{x}^i\}^* - \sum_{\substack{i \in I \subset N^n \\ a_i < 0}} |a_i| \{\bar{x}^i\}^* = SMI(p)(\bar{x}) - SMD(p)(\bar{x})$$

where, $$SMI(p)(\bar{x}) = \sum_{\substack{i \in I \subset N^n \\ a_i > 0}} a_i \{\bar{x}^i\}^*$$

$$SMD(p)(\bar{x}) = \sum_{\substack{i \in I \subset N^n \\ a_i < 0}} |a_i| \{\bar{x}^i\}^*$$

$$T_{\bar{x}_0}(p)(\bar{x}) = \sum_{i \in I \subset N^n} \frac{p^{(i)}(\bar{x}_0)}{\{i!\}^*} \{(\bar{x} - \bar{x}_0)^i\}^*$$

so, $$SMI(T_{\bar{x}_0}(p))(\bar{x}) = \sum_{\substack{i \in I \subset N^n \\ p^{(i)}(\bar{x}_0) > 0}} \frac{p^{(i)}(\bar{x}_0)}{\{i!\}^*} \{(\bar{x} - \bar{x}_0)^i\}^*$$

$$SMD(T_{\bar{x}_0}(p))(\bar{x}) = \sum_{\substack{i \in I \subset N^n \\ p^{(i)}(\bar{x}_0) < 0}} \left|\frac{p^{(i)}(\bar{x}_0)}{\{i!\}^*}\right| \{(\bar{x} - \bar{x}_0)^i\}^*$$

Follows $H(\bar{x}) = SMI(p)(\bar{x}) - SMI(T_{\bar{x}_0}(p))(\bar{x}) = SMD(p)(\bar{x}) - SMD(T_{\bar{x}_0}(p))(\bar{x})$ $$\Diamond p(\overline{X}) = T_{\bar{x}_0}(p)(\overline{X}) = \sum_{\substack{i \in I \subset N^n \\ \|\bar{x}_0 = \mathrm{mf}(\|X\|)\|}} \frac{p^{(i)}(\bar{x}_0)}{\{i!\}^*} \{(\overline{X} - \bar{x}_0)^i\}^*$$

$w(p(\overline{X})) = w(SMI(p)(\overline{X})) + w(SMD(p)(\overline{X}))$
$= w(SMI(T_{\bar{x}_0}(p))(\overline{X})) + w(H(\overline{X})) + w(SMD(T_{\bar{x}_0}(p))(\overline{X})) + w(H(\overline{X}))$
$= w(\Diamond p(\overline{X})) + 2w(H(\overline{X}))$, Therefore, $w(\Diamond p(\overline{X})) \leq w(p(\overline{X}))$ where

| 7A |
|---|
| 7B |

FIGURE 7A

$\bar{x}$ (a real vector) $= \left(x_0^{i_0},...,x_n^{i_n}\right), x \in R^{n+1}, i \in N^{n+1}$;

$\bar{x}_0$ is a real vector defining a corner of the potential solution region and the origin of the Taylor series expansion;

$\bar{X}$ (an interval vector) $= \left(X_o^{i_0},...,X_n^{i_n}\right), X \in I(R)^{n+1}, i \in N^{n+1}$;

$\{x\}^* = x_0 \bullet ... \bullet x_n$;

$p^{(i)}(\bar{x}_0) = \dfrac{\partial^{i_0+...+i_n} p}{\partial^{i_0} x_0 ... \partial^{i_n} x_n}(\bar{x}_0)$, and $i! = (i_0!,...,i_n!)$.

FIGURE 7B

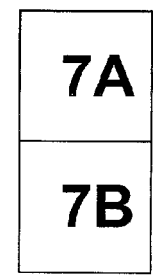

EFFICIENT METHOD OF IDENTIFYING NON-SOLUTION OR NON-OPTIMAL REGIONS OF THE DOMAIN OF A FUNCTION

This application claims the benefit of U.S. Provisional Application No. 60/234,829, filed Sep. 22, 2000, and U.S. Provisional Application No. 60/233,545, filed Sep. 19, 2000, which are both hereby fully incorporated by reference herein as though set forth in full.

The U.S. Government has certain rights in this invention pursuant to Grant Number EIA-8920219 awarded by the National Science Foundation and Grant No. F49620-96-1-0471 awarded by the United States Air Force.

FIELD OF THE INVENTION

This application relates generally to the field of search processes for locating solutions (defined to include optimized solutions (subject to constraints), roots, minima, or maxima) of functions, and, more specifically, to methods of identifying solution containing regions by elimination of non-solution containing regions of the domain of the functions.

RELATED ART

Branch and bound search methods are methods for searching for solutions to functions, such as complex non-linear functions, that defy traditional closed-form techniques for finding solutions. Conventional branch and bound solution searching methods find solutions to the functions by iterating over potential solution-containing regions of the input variables to the functions. During an iteration, if a region is determined to define a solution, it is added to a collection of solutions; if it is guaranteed not to contain a solution, it is removed from further consideration; and if it may contain a solution, it is subdivided, and additional iterations of the method performed over the subdivided regions. The methods continue until all potential solution-containing regions have been considered.

A problem with conventional branch and bound solution searching methods is they do not rapidly and efficiently converge to solution-defining regions of the functions. Consequently, many attempts have been made to increase the speed of convergence of the branch and bound methods. The convergence speed of these methods depends on how efficiently one can detect if a region is guaranteed not to contain any solutions.

A widely used technique in these searching methods is the use of interval analysis to determine if a region does or does not contain a solution. Interval analysis is a branch of applied mathematics that originated with the work of R. E. Moore in the 1960s. See, e.g., Moore, R. E., *Interval Analysis*, Prentice Hall, 1966. In interval analysis, functions known as inclusion functions are used to determine the range of the function output which results from input variables which are imprecise or expressed in terms of intervals, ranges or regions. The output range is then examined to determine if it contains or does not contain a solution (minimum or maximum) of the function. If not, the corresponding intervals, ranges or regions of the input variables are excluded from further consideration. However, intervals, ranges or regions which include possible solutions may then be subdivided, typically using a binary subdivision technique, and additional iterations of the searching algorithm performed on the subdivided areas. The iterations may continue until a solution is located or the search is exhausted.

Referring to FIG. 1, a flowchart of a conventional branch and bound search method employing interval analysis is illustrated.

As illustrated, the method begins in step 102, in which a query is made whether an input queue of potential solution-containing regions is exhausted, or whether there are still one or more potential solution-containing regions on the input queue. If the input queue is exhausted, the method terminates. On the other hand, if the input queue contains one or potential solution-containing regions, step 104 is performed. In step 104, a potential solution-containing region is selected from the input queue.

Step 106 is then performed. In step 106, a function output range corresponding to a potential solution-containing region is determined using an inclusion function.

The function output range is then analyzed to determine if the corresponding potential solution-containing region contains, defines, or does not contain a solution of the function. If the potential solution-containing region contains a solution of the function, step 110 is performed. If the potential solution-containing region defines a solution of the function, step 112 is performed. If the potential solution-containing region does not contain a solution of the function, step 114 is performed.

In step 110, the solution-containing region is subdivided, and the subdivided portions placed on the input queue. Then, another iteration of the method is performed by looping back to step 102.

In step 112, the potential solution region is classified as a solution by placing it on a solution queue, and removing it from the input queue. The method then loops back to step 102 to perform another iteration.

In step 114, the potential solution region is discarded from the input queue, and the method loops back to step 102 for another iteration.

Unfortunately, to date, interval analysis has been applied to certain applications such as computer graphics with mixed results. In particular, the searching methods are still too slow to be viable in such applications because of the real-time constraints that are inherent in these applications. The time and memory requirements of these methods are exponential in the number of digits of precision required as well as in the number of free variables of the functions considered.

SUMMARY

The invention provides a method for efficiently identifying non-solution-containing regions of the domain of a function and a related subdivision method that keeps only those regions where solutions potentially exist. Compared to the conventional interval analysis methods, the new methods proposed here have a time and memory complexity which is the $n^{th}$ root of that of the corresponding conventional method, where n is the "order" of the method used. These methods may be employed in the context of branch and bound solution search methods that use interval analysis described in the previous sections.

The method uses a Taylor Form inclusion function of the function f(x) whose solutions are of interest, where x is a vector having an arbitrary number of components. If f(x) can be expanded in the form of a polynomial T(x) with interval coefficients, the method proceeds by separating the function T(x) into two components: 1.) $T_n(x)$, which is composed of the terms of T(x) with degree at most n, and can be referred to as the low order component; and 2.) T"(x), which is composed of the terms of T(x) with degree greater than n, and can be referred to as the high order component. Therefore, T(x)=T$_n$(x)+T"(x), where the integer n is referred to as the "order" of the method.

The function f(x) on the interval vector domain X can be approximated by f$_n$(x), which may be expressed in terms of the two components of the function as follows: f$_n$(x)=T$_n$(x)+T"(X) (X is an interval vector containing x). Replacing x by X means we bound that function of variable x on the domain X, i.e. T"(X) is some appropriate inclusion function associated with T"(x). The output of T"(X) is a one dimensional real interval that represents the error introduced by approximating f(x) by f$_n$(x) on the domain X.

A possible solution region is determined by solving for f$_n$(x)=0, which is now an equation of order n, lower than the order of the original equation. If n is low enough, closed form solutions may exist. Such is the case for univariate equations of order up to 4, as well as all multivariate equations or first order. Higher order equations can still be used, but the solution methods will be inexact, i.e. they will return solution regions wider than necessary. Once the solution sub-region S is determined, a cropping formula is used to identify one or more sub-regions of the domain X-S which are guaranteed not to contain solutions of the function. The one or more regions may be then be removed from consideration. Optionally, one or more of the remaining regions of the domain of the function may then be subdivided in preparation for additional iterations of the search.

First order methods are of particular interest since the cropping formulas are exact and do not introduce any further error. The cropping formulas for the first order method may be expressed as follows:

$$X_k^* = X_k \cap -\left(c + \sum_{i=0, i \neq k}^{n} a_i X_i + \Diamond NL(X)\right) \Big/ a_k$$

where:

$X^*_k$ is the solution-containing portion of the potential solution region defined along the k$^{th}$ dimension, i.e. the k$^{th}$ component of the cropped solution containing region X*;

$X_i$ is the i$^{th}$ component of the interval vector domain X;

$X_k$ is the k$^{th}$ component of the interval vector domain X $a_i$ is the Taylor series coefficient for $x_i$;

$a_k$ is the Taylor series coefficient for $x_k$;

$$c + \sum_{i=0, i \neq k}^{n} a_i X_i$$

represent the linear (and any constant) terms of the Taylor Form inclusion function (excepting the term for $X_k$); and $\Diamond NL(X)$ represent the bounds on X defined by the non-linear terms of the Taylor series expansion.

In one application, the method identifies one or more portions of a potential solution-containing region as non-solution-containing. Once identified, these one or more portions are removed from the region, and the remaining portion of the region then subdivided in preparation for additional iterations of the search.

The invention also provides a Corner Taylor Form inclusion function that can be used with the foregoing methods. This Corner Taylor Form inclusion function is an interval extension of the expansion of the function f(x) at the corner of a potential solution-containing region that is closest to the origin. This Corner Taylor Form inclusion function has the advantage that it always produces results with less excess width than the natural inclusion function. This is in contrast to the Centered Taylor Form inclusion function, which usually has less excess width than the natural inclusion function only when the widths of the input intervals are smaller than a threshold that depends on the function being investigated.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

FIGS. 3B–3C illustrates the process of subdividing the remaining portion of a potential solution-containing region after application of the first order cropping formula of FIG. 3A, followed by additional applications of the cropping formula over the subdivided regions.

FIG. 6 is a proof that the order in which each dimension of a potential solution-containing region is cropped does not affect the output.

FIGS. 7A–7B is a proof that the width of the intervals generated using the Corner Taylor Form inclusion function is always less than that generated using the natural inclusion function.

DETAILED DESCRIPTION

For purposes of this disclosure, the term "solution(s)" will be used to refer collectively to solution(s), root(s), optimized solution(s), solution(s) subject to constraints, minimum, minima, maximum, or maxima of a function of one or more variables.

Also, for purposes of this disclosure, a memory is any processor readable medium, including without limitation RAM, ROM, EPROM, EEPROM, PROM, disk, hard disk, floppy disk, CD-ROM, DVD, semiconductor memory, etc.

Moreover, the term "region" refers to any n-dimensional region, where n is an integer of one or more, of the domain of a function, including but not limited to a line segment, box, area, cube, etc.

Figure 1:
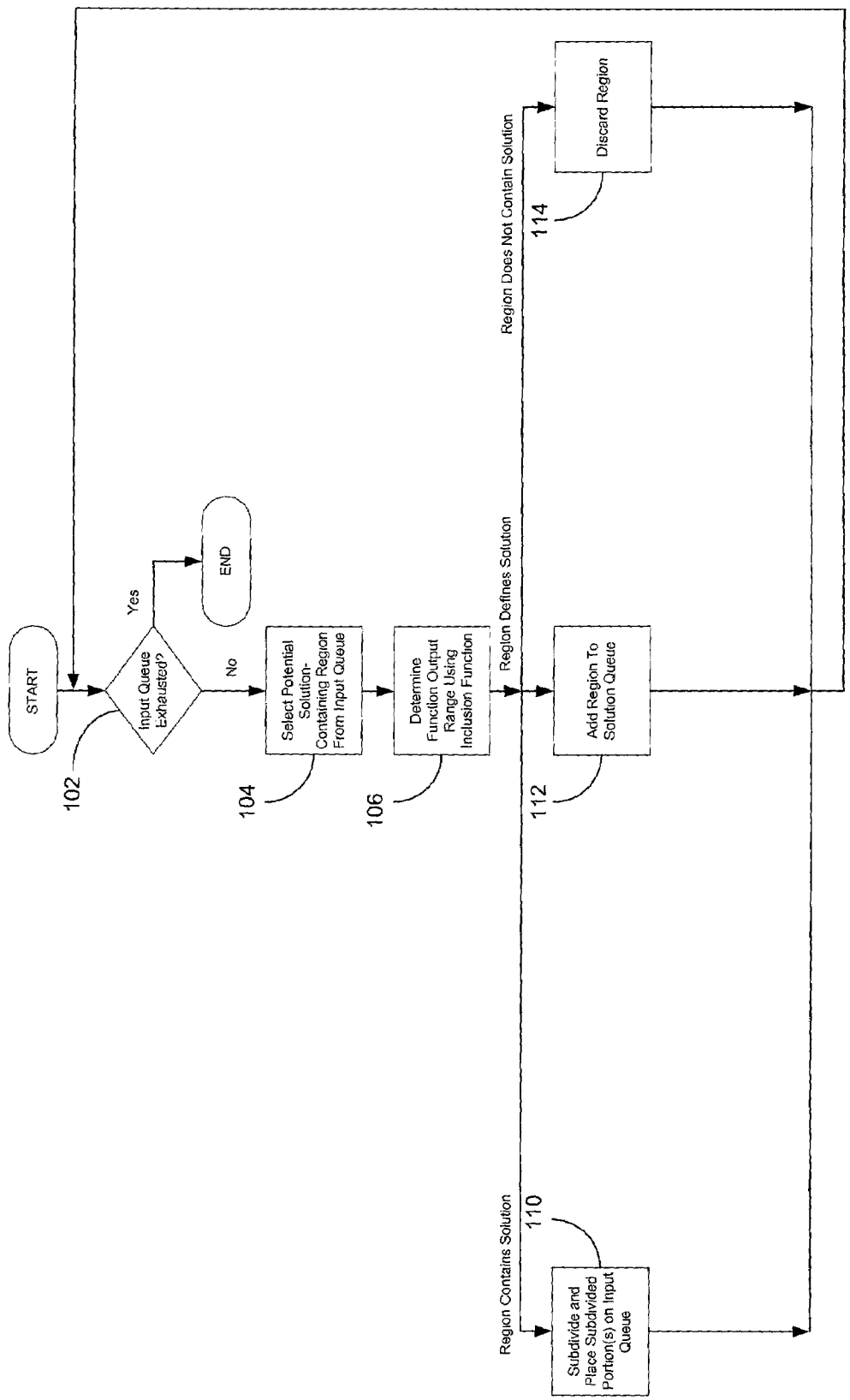
FIG. 1 is a flowchart of a conventional branch and bound searching method employing interval analysis.
Figure 2:
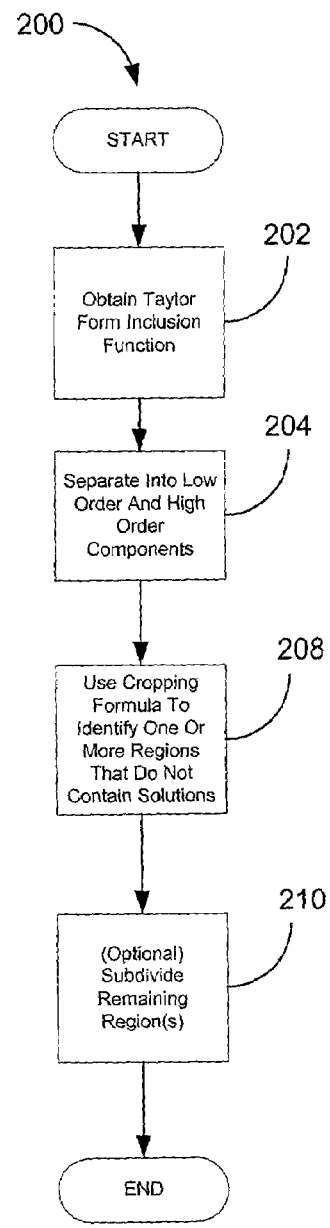
FIG. 2 is a flowchart of one embodiment of a method of identifying one or more regions of the domain of a function that are guaranteed not to contain solutions of the function.

FIG. 2 is a flowchart of one embodiment of a method of identifying one or more regions of the domain of a function where solutions are guaranteed not to exist. This method may be employed in the context of branch and bound methods, such as that illustrated in FIG. 1, that use interval analysis to search for solutions of functions. For example, in one embodiment, the method of FIG. 2 may be employed as part of block 110 in FIG. 1 to exclude one or more portions of the potential solution-containing region that are guaranteed not to contain solutions of the function. Then, the remaining portion of the region would be subdivided and placed on the input queue.

Referring to FIG. 2, in step 202, the method obtains a Taylor Form inclusion function, such as the Corner Form or the Centered Form, of the function f(x), where x is a vector having an arbitrary number of components.

The method proceeds to step 204, where the polynomial T(x), with interval coefficients associated with the Taylor Form inclusion function chosen, is separated into two components: 1.) $T_n(x)$, which is composed of the terms of T(x) with degree at most n, and can be referred to as the low order component; and 2.) $T''(x)$, which is composed of the terms of T(x) with degree greater than n, and can be referred to as the high order component. Therefore, $T(x)=T_n(x)+T''(x)$, where the integer n is referred to as the degree of the method.

In step 208 the function f(x) on the interval vector domain X is bounded by $f_n(x)$, which may be expressed in terms of the two components of the function as follows: $f_n(x)=T_n(x)+T''(X)$ (X is an interval vector containing x). Replacing x by X means we bound that function of variable x on the domain X by computing the associated inclusion function on X. Then, in this embodiment, the solutions to the original equation f(x)=0 are a subset of the solution set of the equation $f_n(x)=0$, which is now an equation of order n, lower than the order of the original equation. If n is low enough, closed form solutions may exist. Such is the case for univariate equations of order up to 4, as well as all multivariate equations or first order. Higher order equations can still be used, but the solution methods will be inexact, i.e. they will return solution regions wider than necessary. Even in this case, the solutions of the equation f(x)=0 are still a subset of the solution set of the equation $f_n(x)=0$. Once the possible solution sub-region S is determined, a cropping formula derived from one or both of the components is used to identify one or more sub-regions of the domain X-S which are guaranteed not to contain solutions of the function. These one or more regions may be then be removed from consideration. Optionally, one or more of the remaining regions of the domain of the function may then be subdivided in preparation for additional iterations of the search. In one embodiment, the cropping formula may be used to successively identify portions of the region where solutions do not exist dimension by dimension, and it can be shown that the order in which each dimension of the potential solution-containing region is cropped does not affect the output (for proof of this, please see FIG. 6).

Step 208 is followed by optional step 210 where the one or more regions are removed from consideration, and one or more of the remaining regions of the domain of the function are subdivided in preparation for additional iterations of the search.

First order methods are of particular interest since the cropping formulas are exact and do not introduce any further error. The cropping formulas for the first order method may be expressed as follows:

$$X_k^* = X_k \cap - \left( c + \sum_{i=0, i \neq k}^{n} a_i X_i + \Diamond NL(X) \right) \Big/ a_k$$

where:

$X_k^*$ is the solution-containing portion of the potential solution region defined along the $k^{th}$ dimension, i.e. the $k^{th}$ component of the cropped solution containing region $X^*$;

$X_i$ is the $i^{th}$ component of the interval vector domain X;

$X_k$ is the $k^{th}$ component of the interval vector domain X;

$a_i$ is the Taylor series coefficient for $x_i$;

$a_k$ is the Taylor series coefficient for $x_k$;

$$c + \sum_{i=0, i \neq k}^{n} a_i X_i$$

represent the linear (and any constant) terms of the Taylor Form inclusion function (excepting the term for $X_k$); and $\Diamond NL(X)$ represent the bounds on X defined by the non-linear terms of the Taylor series expansion.

Figure 3A:
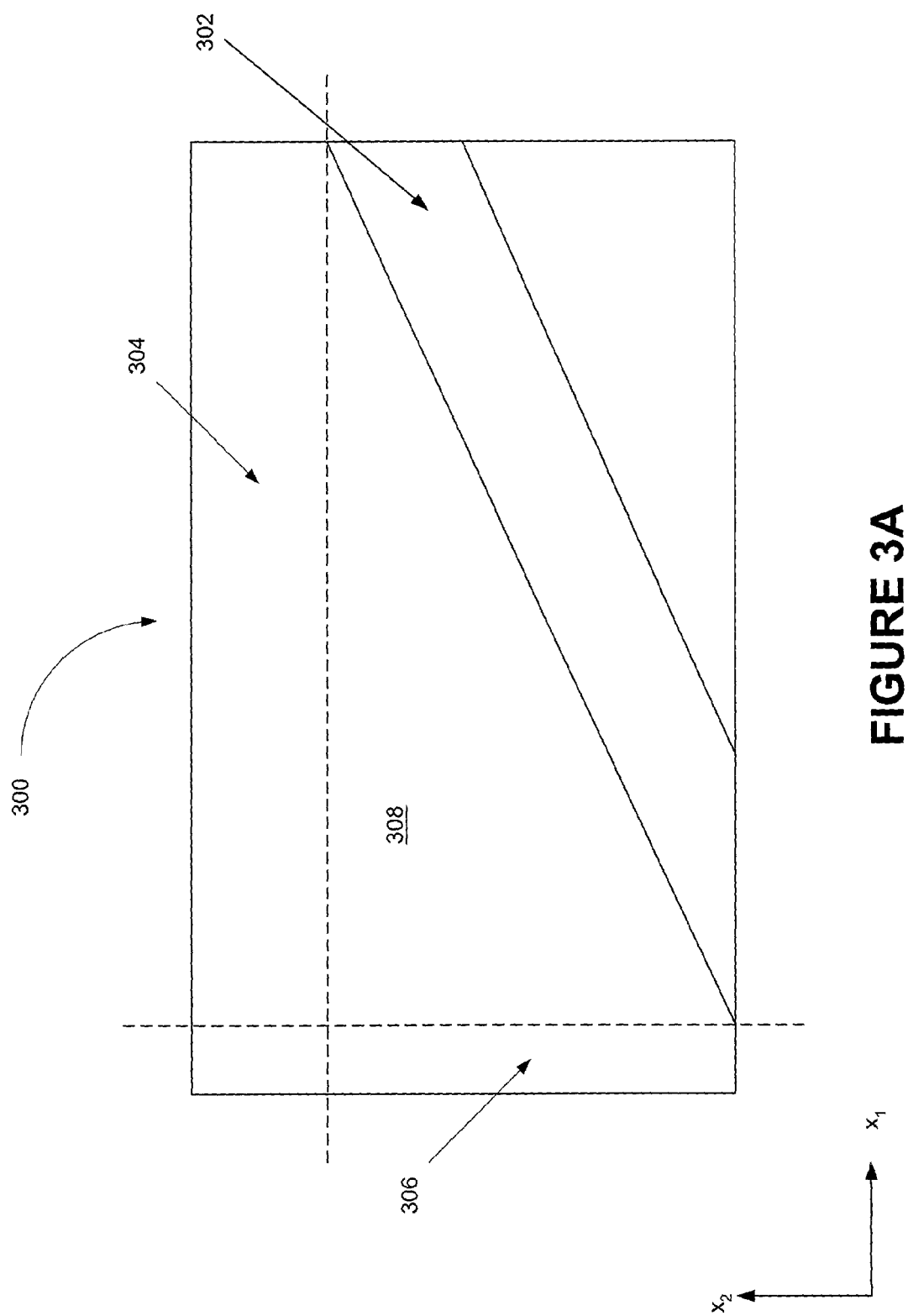
FIG. 3A illustrates the use of a first order cropping formula to identify for removal one or more portions of a potential solution-containing region.

An example application of this cropping formula is illustrated in FIG. 3A. Referring to FIG. 3A, numeral 300 identifies a potential solution region X for the function f(x). For purposes of illustration only, and without limitation, the region is shown as having two dimensions, $X_1$ and $X_2$, but it should be appreciated that regions are possible having any number n of dimensions, where n is an integer of one or more.

Numeral 306 identifies a portion of the region excluded by application of the cropping formula (1) to the first component $X_1$, and numeral 304 identifies a portion of the region excluded by application of the cropping formula (1) to the second component $X_2$.

As can be seen, the remaining region $X^*$, identified by 308, is independent of the order in which the two portions 304 and 306 are excluded from the region 300.

Figure 3C:
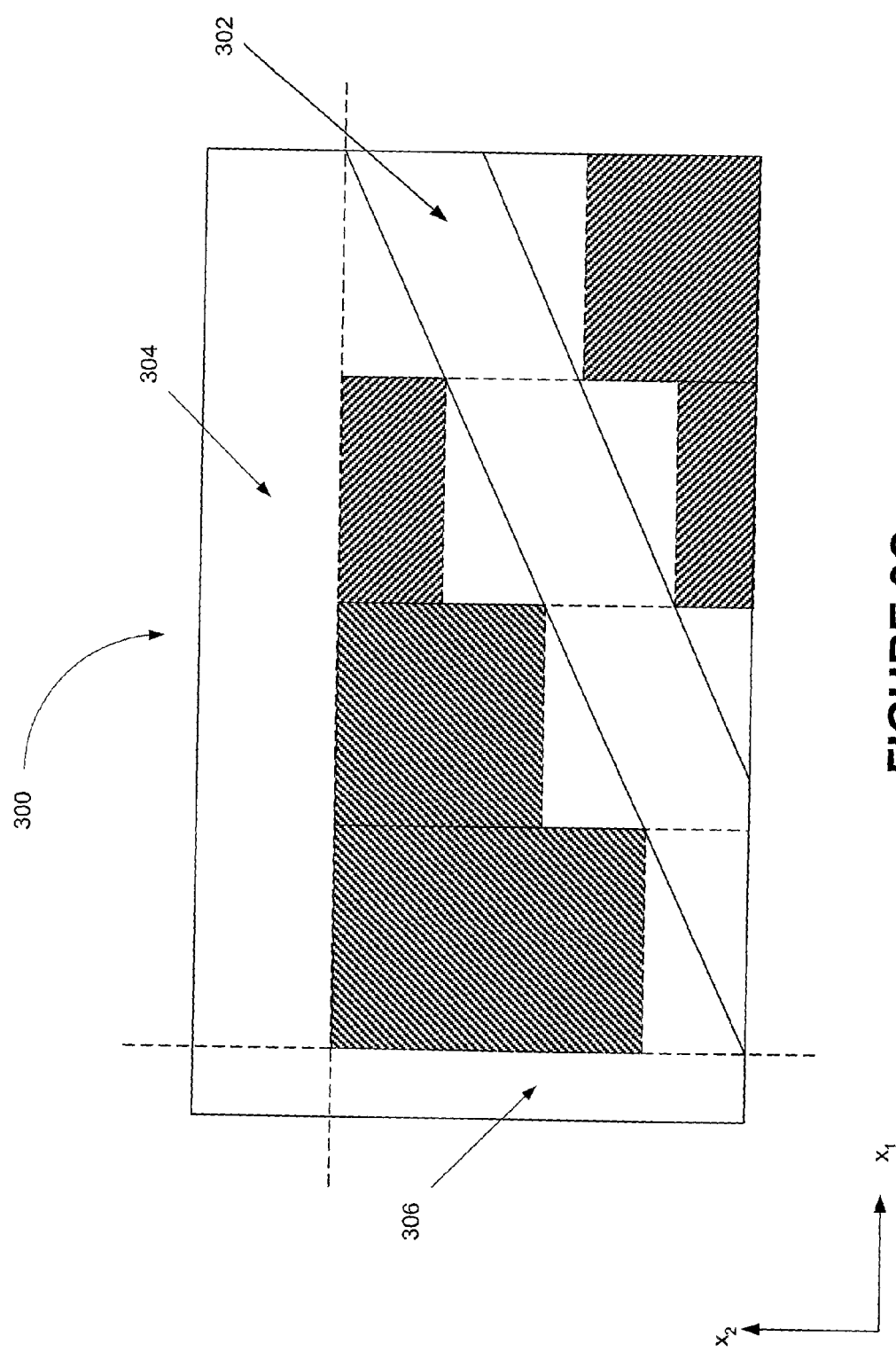

FIG. 3B illustrates how the remaining portion 308 of the potential solution-containing region may be subdivided into portions 310a, 310b, 310c, and 310d, and FIG. 3C illustrates how the cropping formula may be applied to each of the subdivided portions to identify additional (cross-hatched) portions that are guaranteed not to contain solutions. These additional crosshatched portions may be removed, the remaining portions subdivided, and the cropping formula applied again. This process may continue to iterate until the portions that remain adequately define solutions at a suitable level of precision.

The invention also provides a Corner Taylor Form inclusion function that can be used with any of the foregoing methods. For example, referring to FIG. 1, this Corner Taylor Form inclusion function may be used as the inclusion function in step 106. This Corner Taylor Form inclusion function is an interval extension of the expansion of the function f(x) at the corner closest to the origin of a potential solution-containing region.

This Corner Taylor form inclusion function can be expressed as follows:

$$\Diamond T_p(\overline{X}) = \sum_{\substack{i \in N^n \\ \|\overline{x}_0 = \inf(\|\overline{X}\|)\|}} \frac{p^{(i)}(\overline{x}_0)}{\{i!\}_*} \{(\overline{X} - \overline{x}_0)^i\}_*$$

where:

$\overline{x}$ (a real vector)$=(x_0^{i_0}, \ldots, x_n^{i_n})$, $x \in R^{n+1}$, $i \in N^{n+1}$;

$\overline{x}_0$ is a real vector defining a corner of the potential solution region and the origin of the Taylor series expansion;

$\overline{X}$ (an interval vector) $= (X_o^{i_0}, \ldots, X_n^{i_n})$, $X \in I(R)^{n+1}$, $i \in N^{n+1}$;

$\{x\}^* = x_0 \cdot \ldots \cdot x_n$;

$p^{(i)}(\overline{x}_0) = \frac{\partial^{i_0 + \ldots + i_n} p}{\partial^{i_0} x_0 \ldots \partial^{i_n} x_n}(\overline{x}_0)$; and $i \neq (i_0!, \ldots, i_n!)$.

This Corner Taylor Form inclusion function has the advantage that it always produces results with less excess width than the natural inclusion function (for a proof of this, please see FIGS. 7A–7B). This is in contrast to the Centered Taylor Form inclusion function, which usually has less excess width than the natural inclusion function only when the widths of the input intervals are smaller than a threshold that depends on the function being investigated.

This Corner Taylor Form inclusion function may be stored in a memory and accessed by a processor at an indefinite point of time in the future for a variety of uses, e.g., in determining output function ranges, or in the method of FIG. 2. Storage of the Corner Taylor Form inclusion function may also provide efficiencies in the case in which other potential solution-containing regions share in common the corner from which the inclusion function is derived. When these other regions are encountered, the stored inclusion function may be retrieved, and used for purposes of defining output function ranges, or excluding portions of the solution-containing region that are guaranteed not to contain solutions.

The Corner Form Taylor inclusion function and method of FIG. 2 each allow for greatly increased convergence rates, although the impact of the method of FIG. 2 is greater. In particular, the $n^{th}$ order embodiment of the method of FIG. 2 will reduce the time and memory complexity by an order of the $n^{th}$ root of the original complexity of conventional searches (employing the natural inclusion function and binary subdivision). For example, if the conventional approach requires 10,000 iterations to find potential solution-containing regions, a first order embodiment of the method of FIG. 2 will require only 100 iterations (square root of 10,000) to find an equivalent set of potential solution-containing regions.

Figures 8A, 8B:
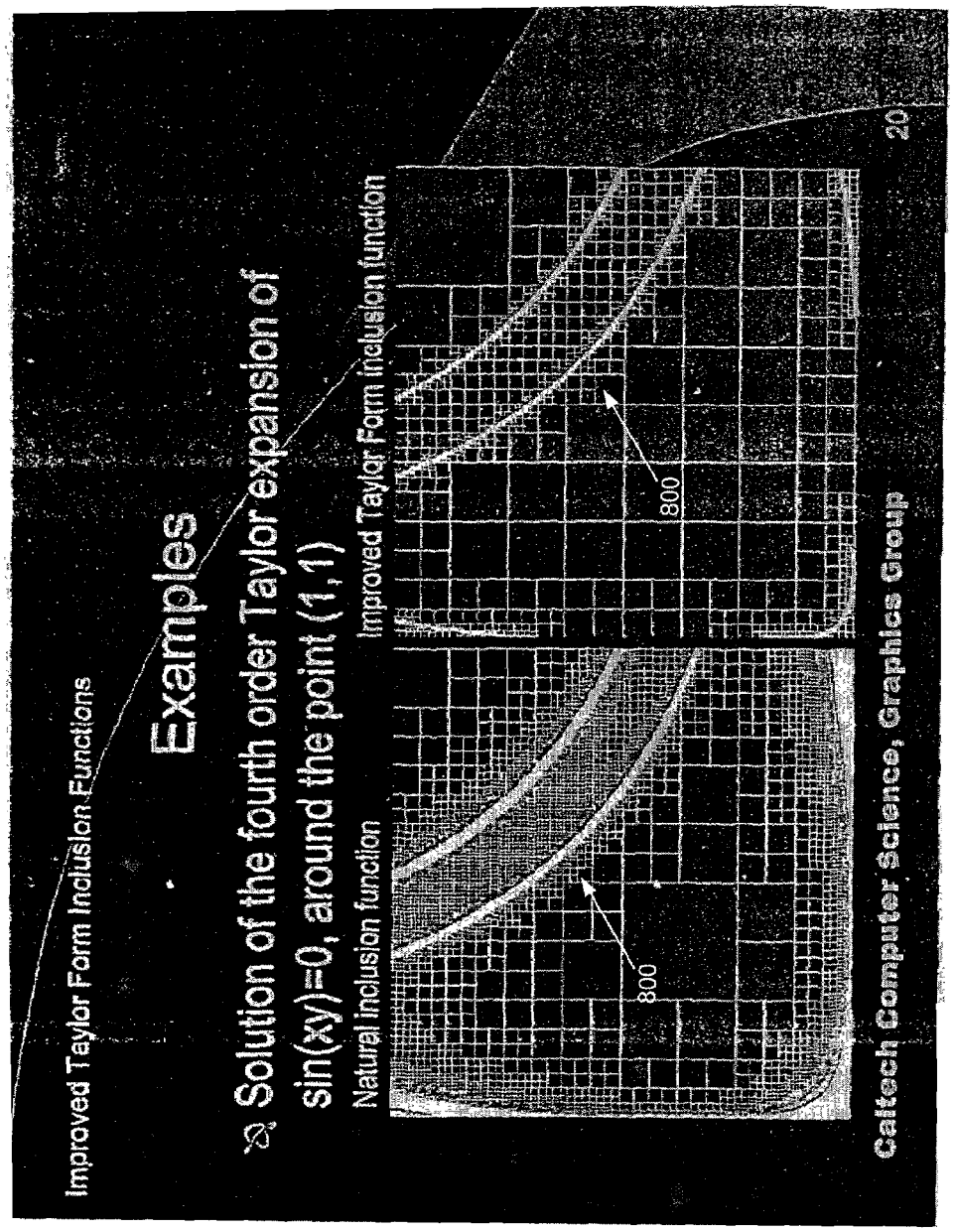
FIGS. 8A–8B illustrate the increased convergence rate and precision possible using Corner Taylor Form inclusion functions alone.
Figures 8C, 8D:
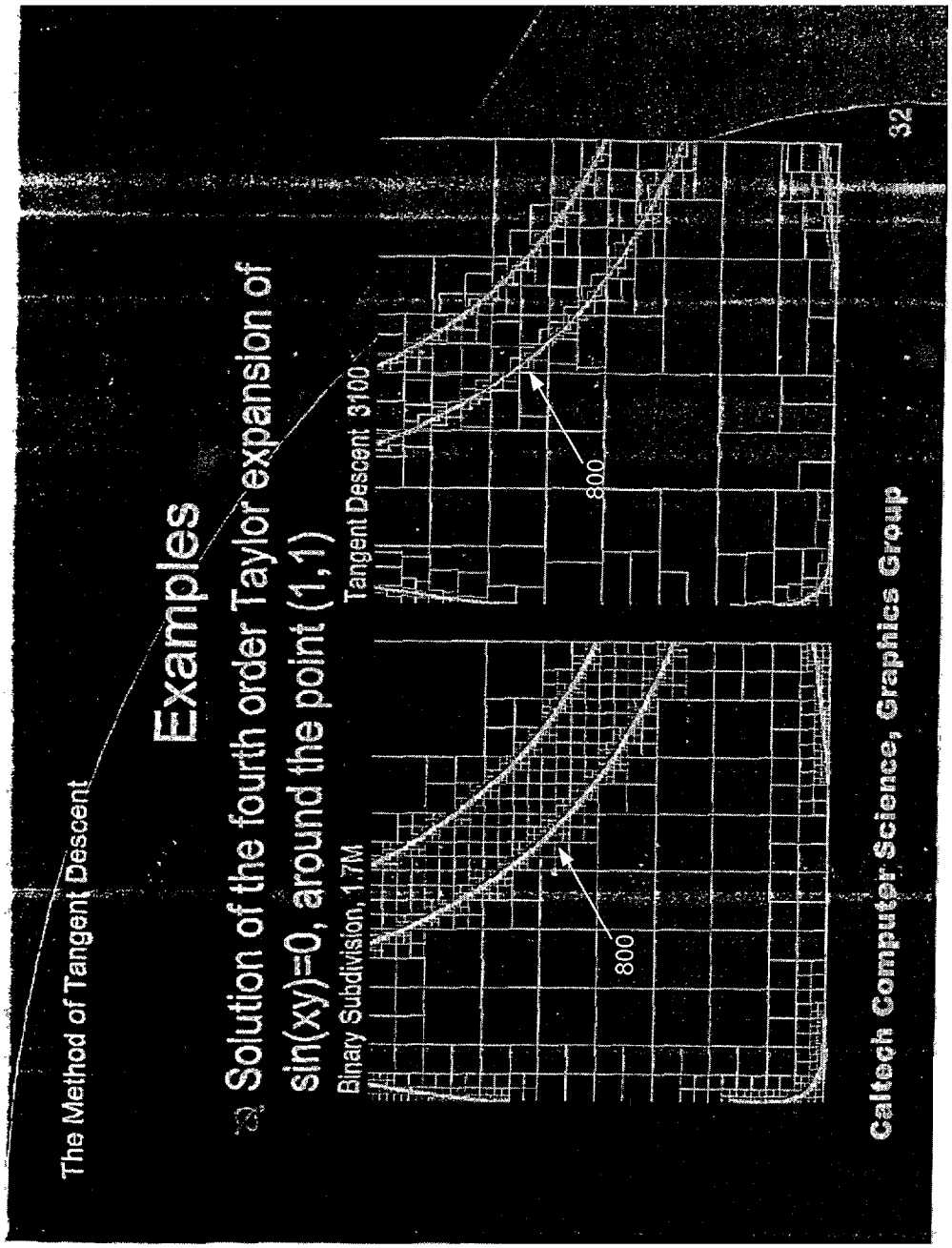
FIGS. 8C–8D illustrate the increased convergence rate possible using the method of FIG. 2. The numbers on top of each figure denote the number of iterations that were required to converge to the solution.

The increased convergence rates possible through Corner Form Taylor inclusion functions and the method of FIG. 2 is illustrated in FIGS. 8A–8D, in which numeral 800 in all four figures identifies solutions to the function sin(xy)=0 around the point (1,1) (the two parallel curves), with a solution accuracy of $10^{-5}$. FIG. 8A illustrates the regions examined in the case of a search method employing the natural inclusion function and binary subdivision; FIGS. 8B and 8C each illustrate the regions examined in the case of a search method employing the Corner Form inclusion function and binary subdivision; and FIG. 8D illustrates the regions examined in the case of a search method employing the Corner Form Taylor inclusion function and the $1^{st}$ order method of FIG. 2 followed by subdivision. The method of FIG. 8A resulted in the examination of ~12 M solution regions, and ~45 M evaluations; the method of FIGS. 8B/8C resulted in the examination of ~1.7 M solution regions, and ~7 M evaluations; and the method of FIG. 8D resulted in the examination of ~3142 solution regions, and 7274 evaluations. Consequently, it can be seen that the impact of the Corner Taylor Form inclusion method, although significant, is exceeded by that of the method of FIG. 2.

Figure 4:
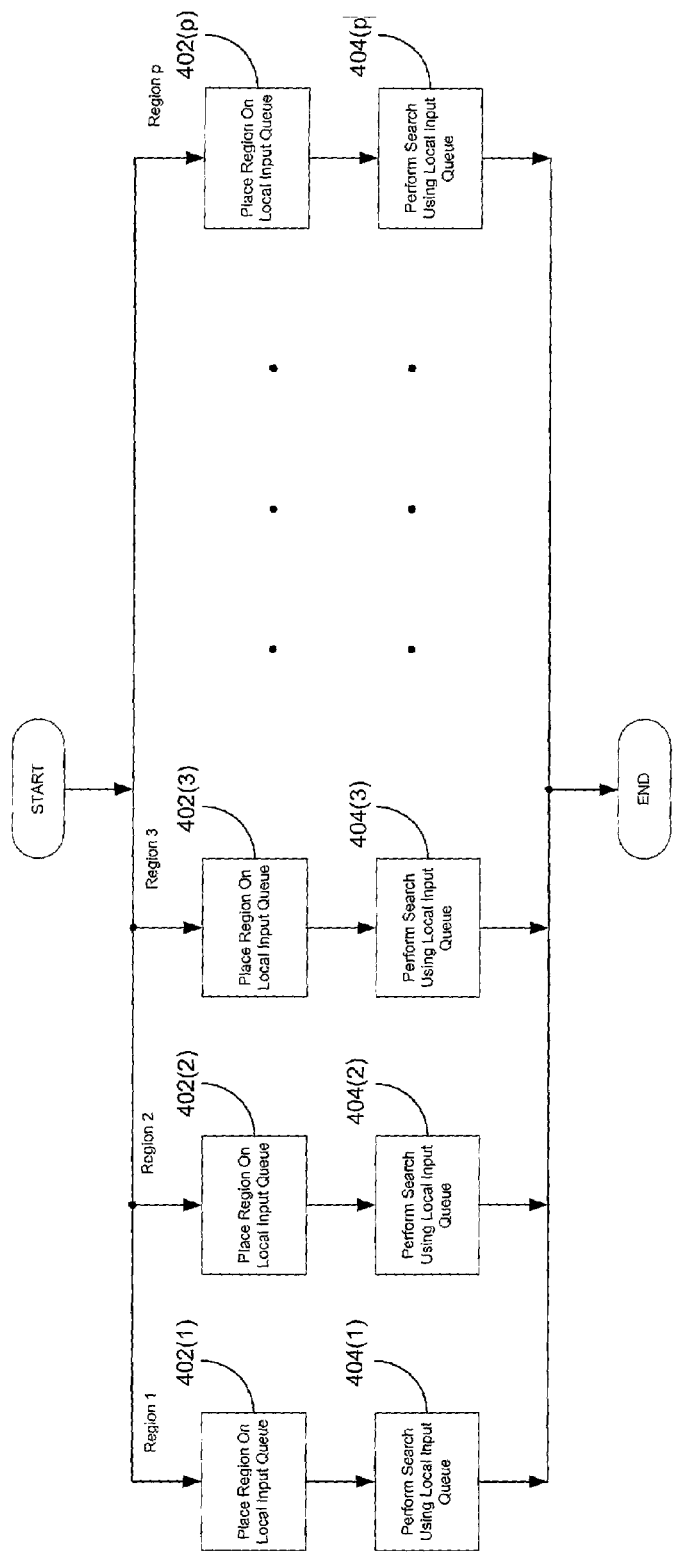
FIG. 4 is a flowchart of a searching method in which one or more potential solution-containing regions are handled in parallel.

Referring to FIG. 4, a method of searching for solutions of a function is illustrated which comprises handling p potential solution-containing regions in parallel, where p is an integer of one or more.

The potential solution regions may be placed on a global input queue, and then each separately analyzed for solutions. To begin, as indicated by steps 402(1), 402(2), 402(3), . . . , 402(p), each region may first be placed on a separate local input queue. Then, as indicated by steps 404(1), 404(2), 404(3), . . . , 404(p), each of the regions may be separately examined in parallel for solutions using, for example, the method of FIG. 2 for identifying non-solution containing regions of the domain of a function, with or without the use of the Corner Taylor Form inclusion function.

Figure 5:
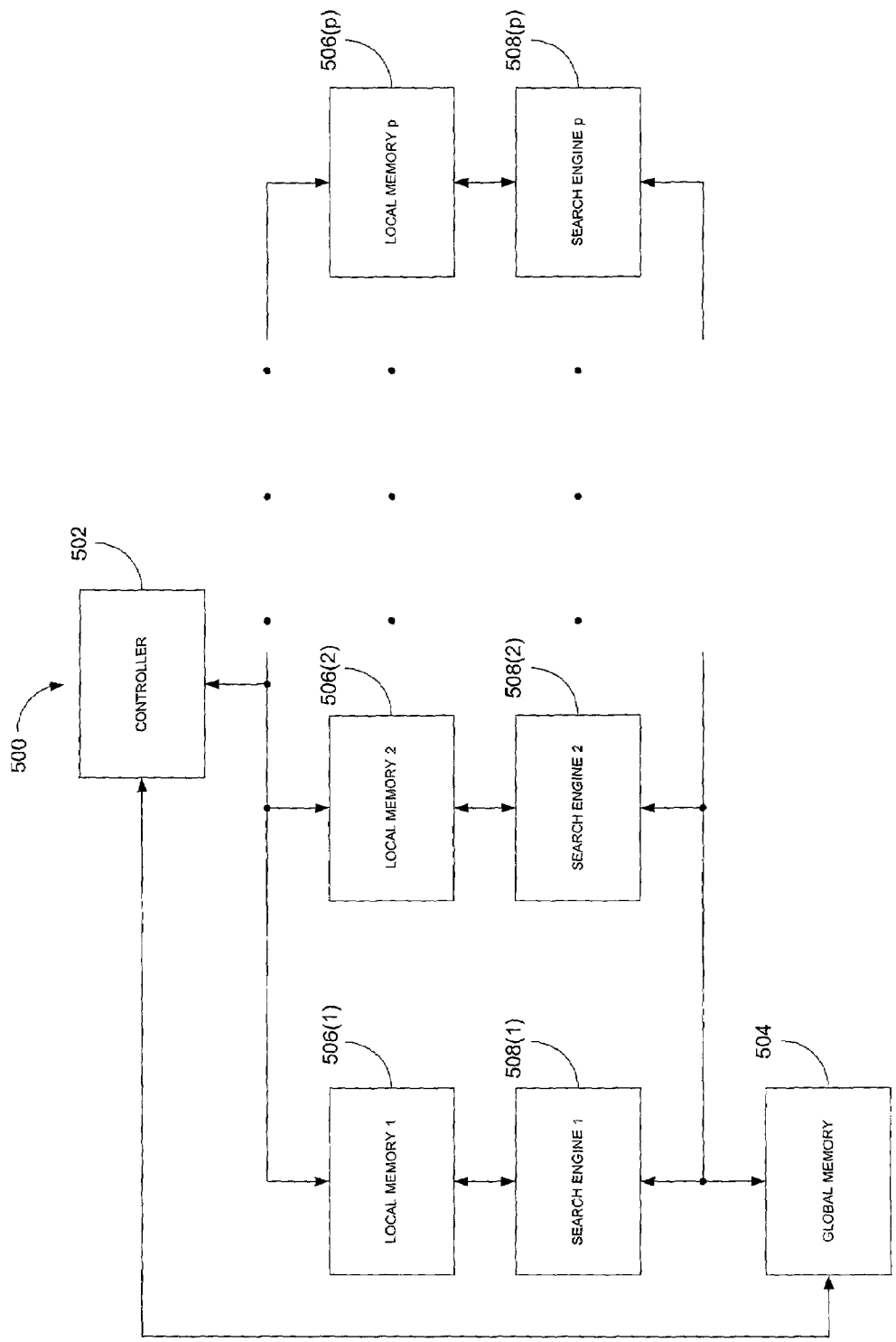
FIG. 5 is a simplified block diagram of system for performing the method of FIG. 4.

Referring to FIG. 5, a system 500 for performing the method of FIG. 4 includes a plurality p of search engines, identified respectively with numerals 508(1), 508(2), . . . , 508(p), where each of the search engines performs in parallel a search for solutions of a function over one or more different potential solution-containing regions using, for example, the method of FIG. 2 for identifying non-solution-containing regions of the domain of the function, with or without use of the Corner Taylor Form inclusion function.

The system also include a controller 502, one or more global memories 504, and one or more local memories for each of the search engines, identified respectively with numerals 508(1), 508(2), . . . , 508(p). As illustrated, the controller 502 has read and write access to the one or more global memories 504, and also write access to each of the local memories for each of the search engines, identified respectively with numerals 506(1), 506(2), . . . , 506(p). Moreover, each search engine has write access to the one or more global memories 504, and read and write access to the one or more local memories assigned to that search engine.

The controller 502 maintains the global input queue on the one or more global memories 504. It addition, it parcels out the potential solution regions from the global input queue maintained on the one or more global memories 504 to each of the p local input queues maintained on the one or more local memories 506(1), 506(2), . . . , 506(p), as appropriate. Each of the search engines maintains the local input queue containing one or more potential storage regions assigned to the search engine. Each of the search engines also adds to the global solution queue maintained on the one or more global memories 504 as appropriate.

The controller 502 and each of the search engines 508(1), 508(2), . . . , 508(p) may each be implemented as hardware, software, or a combination of hardware and software. Example implementations include without limitation one or more synchronous or asynchronous integrated circuit chips, e.g., ASICS, embodying the foregoing method, or one or more processors including but not limited to digital signal processors (DSPs) or microprocessors for executing software embodying the foregoing method and stored on a memory accessible by the processor.

Moreover, it should be appreciated that embodiments are possible in which one or more than one potential solution regions are assigned to each of the p search engines.

Each and any of the methods illustrated or described in this disclosure may be tangibly embodied as a computer program product or as a series of instructions stored or otherwise embodied on a memory.

While various embodiments of the invention have been described, it will be apparent to those of ordinary skill in the art that many more embodiments and implementations are possible that are within the scope of this invention.

The invention claimed is:

1. A system for searching for solutions of a function using a method of identifying one or more regions of a domain of a function f(x) that do not contain solutions, comprising:
a controller, a global memory, a plurality of search engines, and a local memory corresponding to each of the search engines, wherein the controller is configured to access the global memory to assign a different portion of a potential solution region stored in the global memory to the local memory for each of the search engines, and responsive thereto, each search engine is configured to execute a method comprising:
accessing a Taylor Form inclusion function obtained from the function f(x) that is separated into first and second components, the first component being of order n or less, and the second component being of order greater than n, where n is an integer;
bounding the second component on an interval vector domain X, where X corresponds to the portion of the potential solution region assigned to the corresponding local memory; and
using a cropping formula derived from one or both of the components of the Taylor Form inclusion function to identify whether the portion of the potential solution region assigned to the corresponding local memory does not contain a solution.

2. The system of claim 1 wherein the first component comprises linear and constant terms of the Taylor Form inclusion function.

3. The system of claim 2 wherein the cropping formula is a first order cropping formula, as follows:

$$X_k^* = X_k \cap -\left(c + \sum_{i=0, i \neq k}^{n} a_i X_i + \Diamond NL(X)\right) / a_k$$

wherein:
$X_k^*$ is the solution-containing portion of the potential solution region defined along the $k^{th}$ dimension;
$X_i$ is the $i^{th}$ component of the interval vector domain X;
$X_k$ is the $k^{th}$ component of the interval vector domain X;
$a_i$ is the Taylor series coefficient for $x_i$;
$a_k$ is the Taylor series coefficient for $x_k$;

$$c + \sum_{i=0, i \neq k}^{n} a_i X_i$$

represent the linear (and any constant) terms of the Taylor Form inclusion function (excepting the term for $X_k$); and $\Diamond NL(X)$ represent the bounds on X defined by the nonlinear terms of the Taylor series expansion.

4. The system of claim 1 wherein the cropping formula is successively applied to each of the dimensions of a potential solution-containing region.

5. The system of claim 4 wherein a result of applying the cropping formula is independent of the order in which it is applied to dimensions of the potential solution-containing region.

6. The system of claim 1 wherein the controller is further configured to exclude from consideration any portion of the potential solution region identified by a search engine as being non-solution-containing, and subdivide any remaining one or more regions of the domain of the function.

7. The system of claim 6 wherein the controller is further configured to search for solutions of the function in the subdivided portions.

8. The system of claim 1 wherein f(x) is expandable into a polynomial T(x) with interval coefficients, and wherein the separating step comprises separating T(x) into two components: 1.) low order component $T_n(x)$, which is composed of terms of T(x) with degree at most n; and 2.) high order component $T''(x)$, which is composed of terms of T(x) with degree greater than n.

9. The system of claim 8 wherein the cropping formula is derived by:
approximating the function f(x) on the interval vector domain X by $f_n(x)$, which may be expressed in terms of the two components of the function as follows: $f_n(x) = T_n(x) + T''(X)$, where X is an interval vector containing x; and
deriving the cropping formula by solving for $f_n(x) = 0$, which is now an equation of order n, lower than the order of the original equation.

* * * * *